United States Patent [19]
Garwood

[11] Patent Number: 5,115,624
[45] Date of Patent: May 26, 1992

[54] THERMOPLASTIC SKIN PACKING MEANS

[75] Inventor: Anthony J. M. Garwood, Bayswater, Australia

[73] Assignee: Seawell Corporation N.V., Curacao, Australia

[21] Appl. No.: 500,218

[22] Filed: Mar. 28, 1990

Related U.S. Application Data

[60] Continuation of Ser. No. 224,381, Jul. 26, 1988, abandoned, which is a division of Ser. No. 86,046, filed as PCT/AU86/00339, Nov. 7, 1986, Pat. No. 4,840,271.

[30] Foreign Application Priority Data

Nov. 14, 1985 [AU] Australia .............................. PH3406
Feb. 24, 1986 [AU] Australia .............................. PH4760
Nov. 7, 1986 [WO] World Int. Prop. O. ........................ PCT/AU86/00339

[51] Int. Cl.$^5$ ...................... B65B 31/02; B65B 47/10; B65B 25/08; B65B 11/52
[52] U.S. Cl. .......................... 53/427; 53/432; 53/433; 53/453; 53/467; 53/475; 53/478; 426/404
[58] Field of Search ................. 53/511, 509, 559, 171, 53/173, 433, 434, 449, 453, 475, 240, 244, 249, 427, 432; 426/119, 129, 118, 124, 324, 404; 206/526; 220/23

[56] References Cited

U.S. PATENT DOCUMENTS

| | | |
|---|---|---|
| 2,438,089 | 3/1948 | Carson . |
| 2,865,499 | 12/1958 | Brogren . |
| 3,038,593 | 6/1962 | Root . |
| 3,116,153 | 12/1963 | Seiferth et al. . |
| 3,226,236 | 12/1965 | Weller . |
| 3,363,395 | 1/1968 | King .................................. 53/511 |
| 3,467,244 | 9/1969 | Mahaffy et al. . |
| 3,481,100 | 12/1969 | Bergstrom ...................... 53/559 X |
| 3,490,576 | 1/1970 | Alessi et al. . |
| 3,514,029 | 5/1970 | Powell . |
| 3,545,163 | 10/1970 | Mahaffy et al. ............... 53/511 X |
| 3,574,642 | 4/1971 | Weinke ........................ 426/129 X |
| 3,624,787 | 11/1971 | Newman . |
| 3,679,093 | 7/1972 | Chang .......................... 220/23 X |
| 3,681,092 | 8/1972 | Titchenal ..................... 426/124 X |
| 3,686,822 | 8/1972 | Wolfelsperger . |
| 3,695,900 | 10/1972 | Young . |
| 3,750,362 | 8/1973 | Kishpaugh .................... 53/453 X |
| 3,792,181 | 2/1974 | Mahaffy et al. . |
| 3,843,806 | 10/1974 | Kishpaugh et al. . |
| 3,851,441 | 12/1974 | Marchard ..................... 53/559 X |
| 3,903,309 | 9/1975 | Mahaffy et al. ................... 429/129 |
| 3,972,155 | 8/1976 | Mahaffy et al. . |
| 4,055,672 | 10/1977 | Hirsh et al. . |
| 4,058,953 | 11/1977 | Sanborn, Jr. et al. . |
| 4,069,348 | 1/1978 | Bush ............................. 206/526 X |
| 4,114,348 | 9/1978 | Mahaffy et al. . |
| 4,201,030 | 5/1980 | Mahaffy et al. . |
| 4,308,711 | 1/1982 | Mahaffy et al. . |
| 4,340,138 | 7/1982 | Bernhardt . |
| 4,349,999 | 9/1982 | Mahaffy et al. . |
| 4,411,122 | 10/1983 | Cornish et al. . |
| 4,424,659 | 1/1984 | Perigo et al. . |
| 4,454,945 | 6/1984 | Jabrin et al. . |
| 4,491,225 | 1/1985 | Baillod . |
| 4,517,206 | 5/1985 | Murphy et al. ............... 206/526 X |
| 4,543,770 | 10/1985 | Walter ............................... 53/511 |
| 4,574,174 | 3/1986 | McGonigle .................. 426/118 X |
| 4,581,764 | 4/1986 | Plock et al. . |
| 4,622,229 | 11/1986 | Toshitsugu . |
| 4,683,139 | 7/1987 | Cheng . |
| 4,685,274 | 8/1987 | Garwood ...................... 53/511 X |

FOREIGN PATENT DOCUMENTS

| | | |
|---|---|---|
| 26918/67 | 9/1967 | Australia . |
| 18600/70 | 8/1970 | Australia . |
| 1153953 | 9/1983 | Canada . |
| 0116394 | 8/1984 | European Pat. Off. . |
| 1939216 | 8/1969 | Fed. Rep. of Germany . |
| 2550388.2 | 11/1975 | Fed. Rep. of Germany . |
| 2837127 | 3/1979 | Fed. Rep. of Germany . |
| 3114508 | 11/1982 | Fed. Rep. of Germany . |
| 1199998 | 7/1970 | United Kingdom . |
| 1206023 | 9/1970 | United Kingdom . |
| 1378140 | 9/1970 | United Kingdom . |
| 1286917 | 8/1972 | United Kingdom . |
| 1392580 | 4/1975 | United Kingdom . |
| 2041318 | 9/1980 | United Kingdom . |

Primary Examiner—Horace M. Culver
Attorney, Agent, or Firm—Foley & Lardner

[57] ABSTRACT

A method of packaging goods including providing a base and placing goods over the base. A flexible web of gas permeable skin wrapping plastics material is then applied over the base and the goods, and air or gas is evacuated from between the base and the skin wrapping so as to allow the skin wrapper to flexibly displace onto the goods to at least partially skin pack the goods. A lid is then applied over the skin wrapping and spaced from the wrapping. A desired gas is then provided in the space between the lid and the skin wrapping to enhance the keeping properties of the packaged goods by permeating the skin wrapping. The lid is sealed to the base so that the space is permanently retained, and the skin wrapping is attached relative to the base.

33 Claims, 3 Drawing Sheets

THERMOPLASTIC SKIN PACKING MEANS

This is a continuation application of prior application Ser. No. 07/224,381, filed Jul. 26, 1988, now abandoned, which is in turn a divisional application of Ser. No. 086,046, filed Jun. 19, 1987. Grandparent application Ser. No. 086,046 is the national stage of PCT/AU86/00339, filed Nov. 7, 1986, and is now U.S. Pat. No. 4,840,271.

FIELD OF THE INVENTION

This invention relates to improved packaging and relates particularly, but not exclusively, to improved packaging for containing meat, fish, poultry, vegetables or other food products.

DESCRIPTION OF THE PRIOR ART

Hitherto, in the art of packaging meat, fish, poultry, vegetables or other food products, it has been a problem to (a) provide for relatively long shelf life of the packaged goods, (b) to provide a package which will not affect the appearance or keeping qualities of the packaged goods, (c) to provide a package which is relatively simple to manufacture, (d) to provide an inexpensive yet sufficiently strong package and (e) to provide a package wherein fogging of the package from moisture carried in the packaged goods will be inhibited.

Packaging has been known which includes certain gases to enhance the keeping qualities of the contents. For example, it is known to use packaging such as disclosed in U.S. Pat. No. 4,685,274, the subject matter of which is hereby incorporated by reference. The shelf life of the packaged goods can thereby be enhanced. Typically these packages are made from a plastics material and the plastics material provides a partial barrier to the ingress of unwanted gases. Some of the plastics material is such that it allows gases which may generate within the package to escape. Other known plastics materials allow certain gases to permeate to enhancing the keeping qualities of the packaged goods.

STATEMENT OF THE INVENTION

The present invention attempts to overcome one or more of the aforementioned problems by including a skin wrapping in the total package. Skin packing is a known technique where goods are tightly packaged within a wrapping material and where substantially all of the atmospheric air is excluded. This known technique has been utilized to provide a different packaging method and structure than hitherto known.

According to a first broad aspect of the present invention, there may be provided a method of packaging goods which, in general terms, includes placing perishable goods in a base, placing a web of flexible material over the base and the goods, allowing the flexible web to displace itself over and, thereby, at least partially skin pack the goods, applying a lid to the base over the flexible web, sealing the lid and the flexible web to the base, and charging the space between the lid and the flexible web with a gas that will permeate the flexible web and prolong preservation of the package goods.

According to a further aspect of the present invention there may be provided an improved package in which perishable goods placed on a base are at least partially skin packed by a flexible plastic web. The base is covered by a lid, which creates a space between the skin packed goods and the lid. The lid and the flexible web are sealed to the base and a gas selected for preserving the skin wrapped goods is introduced into the space. The flexible skin packing web is permeable to the gas.

Most preferably said desired gas has sufficient volume and is of such a type that it will enhance the keeping qualities of the packaged goods.

It is also preferred that there be a further web of plastics material between said base and said goods so that said goods will be substantially enclosed in a skin packing by said flexible web and said further web and substantially without any air therebetween.

Another aspect of the invention is an apparatus for making the improved package. This apparatus includes a station where the goods placed on the base are at least partially skin packed. The apparatus further includes a lid sealing station which the package under assembly sequentially reaches after the skin packing station. Here, the lid is sealed to the base, and a desired gas inserted into the space between the skinpacking web and the lid.

BRIEF DESCRIPTION OF PREFERRED EMBODIMENTS

In order that the invention can be more clearly ascertained the construction of preferred embodiments will now be described with reference to the accompanying drawings wherein:

FIGS. 1 through 5 diagrammatically represent side views of five different types of packaging within the scope of the present invention;

DETAILED DESCRIPTION OF PREFERRED EMBODIMENTS

Figure 1:
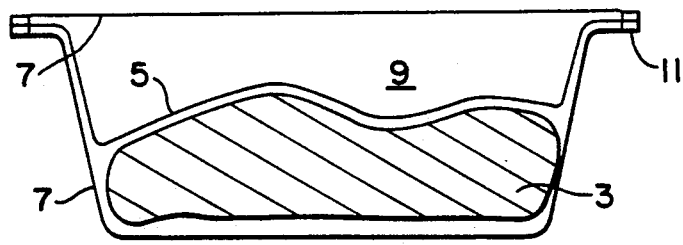

Referring now to FIG. 1 there is shown packaging made of plastics materials. The packaging comprises a generally rectangular shaped base 1 with a bottom of the base being somewhat lower than a top surface of the base. The base 1 is preferably made by a thermo forming process as will be described later. Typically the base 1 is made from a plastics material which may be gas permeable or it may be a partial gas barrier material. Examples of gas permeable materials are a multi-layer web comprising one layer of P.V.C. and another layer of P.E. The P.V.C. can have a thickness of about 400 microns while the thickness of the P.E. can be about 70 microns. Throughout this specification the term micron is to be understood as a dimension equal to 1/1000 of a millimeter. A micron is sometimes referred to as micrometer. Alternatively, the material may be a multi-layered web of P.V.C. with a heat sensitive coating which will enable heat bonding to other plastics components in the package. The P.V.C. can be of a thickness of 450 microns and the coating can be of a thickness of about 5 microns. When a partial gas barrier material is provided, then it may be comprised of multi-layered web of P.V.C./P.V.D.C./P.E. The overall thickness of the plastics material is preferably about 450 microns. If desired, the base may be of a single web of plastics material such as P.V.C. of about 450 microns. Other suitable materials can be chosen if desired. It should be understood that polyethylene will provide for a relatively low gas barrier, P.V.C. will provide for a high gas barrier and P.V.C. in a multilayered form such as P.V.C./P.V.D.C. will provide an even higher gas barrier. Aluminium materials such as of about 20 micron thickness will provide for an even higher gas barrier material. All of these materials are suitable for any of the webs of any of the embodiments disclosed herein.

Goods 3 are provided in the base 1. The goods 3 are typically meat, fish, poultry or fresh vegetables although other types of goods such as foodstuffs can be packaged if desired. Typically the goods 3 have about the same shape and are of the same size as the bottom of the base 1 so that the base 1 is substantially filled with goods over the bottom of the base 1.

A web of flexible plastics material 5 skin packages the goods 3 to the base 1. The flexible plastics material 5 is typically of polyethylene/E.V.A. of 50–100 micron thickness. Alternatively, it may comprise a plasticized P.V.C. of 50–100 micron thickness which is preferably heat sealable to the base 1. It may be otherwise sealable to the base if desired. The above described web 5 is a gas permeable web. If a partial gas barrier web is required then it may comprise a multi-layered web of P.E./P.V.D.C./E.V.A. of about 50–100 micron thickness overall. Other suitable plastics materials for the web can be used if desired.

A lid 7 is fitted over the top of the base 1 so as to provide a free space 9 between the web 5 and the lid 7. The lid 7 and the web 5 are sealed to the base 1 around a peripheral lip 11 of the base 1. Conveniently the sealing is by way of a heat sealing although other forms of sealing are envisaged. The free space 9 can contain air if desired and/or a suitable gas which will enhance the keeping of the packaged goods. Typically the volume of the free space 9 is arranged to be at least equal to the volume of gas necessary to maintain the keeping of the packaged goods for several days or several weeks depending on the nature of the goods and the sale time conditions applicable following packaging.

The lid 7 is typically of 80–120 microns in thickness. If it is of a gas permeable material it may comprise a multi-layer of P.V.C./P.E. Alternatively, it may comprise a multi-layer of P.V.C. with a heat sensitive coating, such as an adhesive, to effect sealing to the flexible web 5 which is, in turn, sealed to the peripheral lip 11 of the base 1. Alternatively, it may be a single web of plastics material such as P.V.C.

If the lid material is to be a partial gas barrier, then one suitable form may comprise polyester/P.V.D.C./P.E. or other suitable materials. If a very high gas barrier is required then the lid can be aluminum which may be coated with a plastics material to enhance bonding to peripheral lip 11.

In a further variation of the container referred to in FIG. 1, the materials may be as follows. The base 1 may be of P.V.C. whilst the web 5 may be of a plasticized P.V.C. (P.P.V.C.), and the lid may be P.V.C. The thicknesses of the plastics materials may be generally of the same thickness as previously described.

In a further variation of materials, if the lid 7 and the web 5 are to be peeled off the base 1 as a single unitary structure, then the base 1 may be either P.V.C./E.V.A. which is co-extruded or an extrusion laminate or a laminate. The flexible web 5 may be plasticized P.V.C. (P.P.V.C.), and the lid 7 may be P.V.C. The thicknesses of the base 1, the web 5 and the lid 7 may be as previously described.

In a further embodiment where the lid only is to be peeled off leaving the flexible web 5 intact with the base 1, then the base 1 may be of P.V.C., the flexible web 5 of a plasticized P.V.C. (P.P.V.C.), whilst the lid 7 is of a P.V.C./E.V.A. laminate which can be formed as a co-extrusion or an extrusion laminate. When the lid 7, or the lid 7 and the flexible web 5 are peeled off, oxygen can contact the goods 3 within the base 1 by either directly contacting the goods or by passing through the flexible web 5. It is known that red meat turns dark brown when oxygen is depleted from the blood. The red colour can be restored by allowing oxygen to contact the blood on the surface of the meat by removing the lid 7, or the lid 7 and the flexible web 5.

Figure 2:
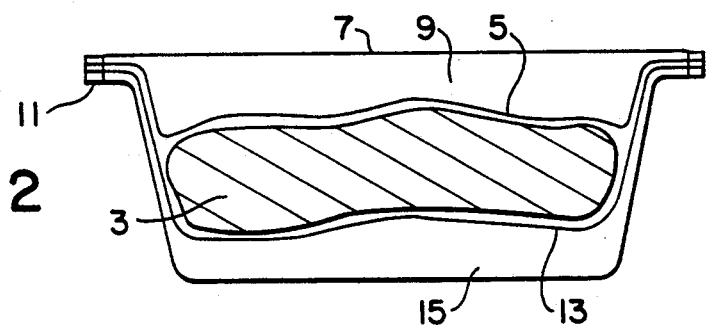

Referring now to FIG. 2 there is shown a construction very similar to that of FIG. 1 and accordingly like numerals have been given to the same components. In this construction, the goods 3 are received on a further web 13 of plastics material which may be the same material as web 5. In this embodiment the goods 3 are completely skin packed around their external surface by the web 5 of plastics material and the further web of plastics material 13. It is noted that a further free space 15 is provided underneath the goods 3 below the further web 13 of plastics material. This free space 15 may be filled with gas such as air and/or other gas to enhance the keeping of the packaged goods 3. This gas may be the same as or different from the gas in the free space 9.

Figure 3:
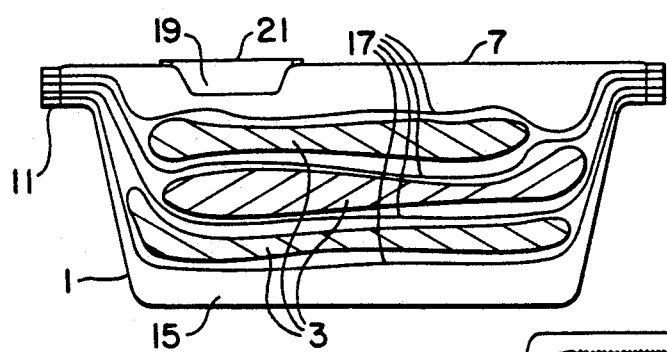

FIG. 3 shows an embodiment similar to that of FIG. 2 but wherein there are a plurality of layers of packaged goods 3. In this embodiment, each of the layers of goods 3 is individually skin wrapped by its own individual web of plastics material designated generally by numeral 17. Each of the webs of plastics material 17 may comprise the same materials as that proposed for the webs 5 and 13. In this embodiment the lid 7 may include a pouch 19 into which condiments can be provided. Typically the condiments can be sauces for the packaged goods. The pouch 19 can have a removable cover 21 which may conveniently comprise a web of paper or the like with a suitable adhesive medium on the underside to bond to the lid material around the periphery of the pouch 19.

Figure 4:
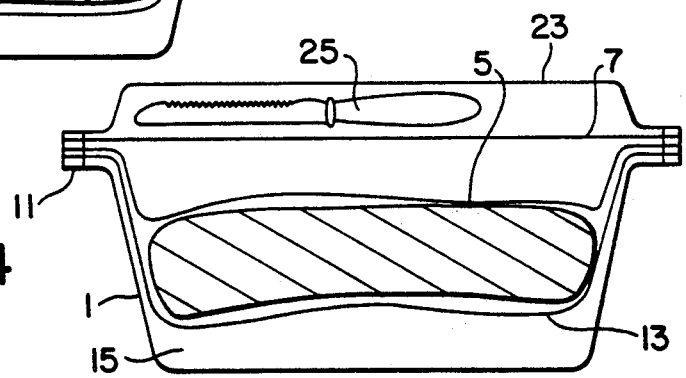

FIG. 4 shows an embodiment similar to that of FIG. 2 but wherein there is additionally provided an upper lid 23 which contains eating implements, such as a knife, fork or spoon 25.

Figure 5:
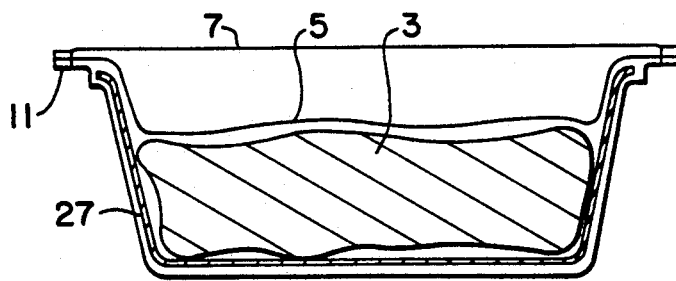

FIG. 5 shows an embodiment similar to that of FIG. 1 but wherein there is additionally provided an tray 27 suitable for placement in an oven. The tray 27 may conveniently be comprised of metal foil or of a plastics material such as crystallizable polyethylene terephthalate C.P.E.T. of about 400 microns in thickness. This material C.P.E.T. is known for its dual over usable qualities i.e.-thermal and microwave-and is used in the food packaging industry.

In the case of embodiments shown in FIGS. 1 through 5 the base 1 may be of a semi rigid construction while the webs 5, 13, 17 and 7 and 17, 7 are relatively flexible. In the case of the embodiment shown in FIGS. 3 and 4, the lid 7 or lid 23 may be of a semi rigid construction.

If desired, punched openings may be made through the various webs 5, 13 and 17 around the peripheral sides of the goods 3 in such a manner that the goods 3 are still sealed within the webs, but so that there are openings extending therethrough but not into the spaces therebetween. This will allow the gas which is in the free spaces 9 and 15 to freely circulate around the webs covering the goods 3.

Figure 6:
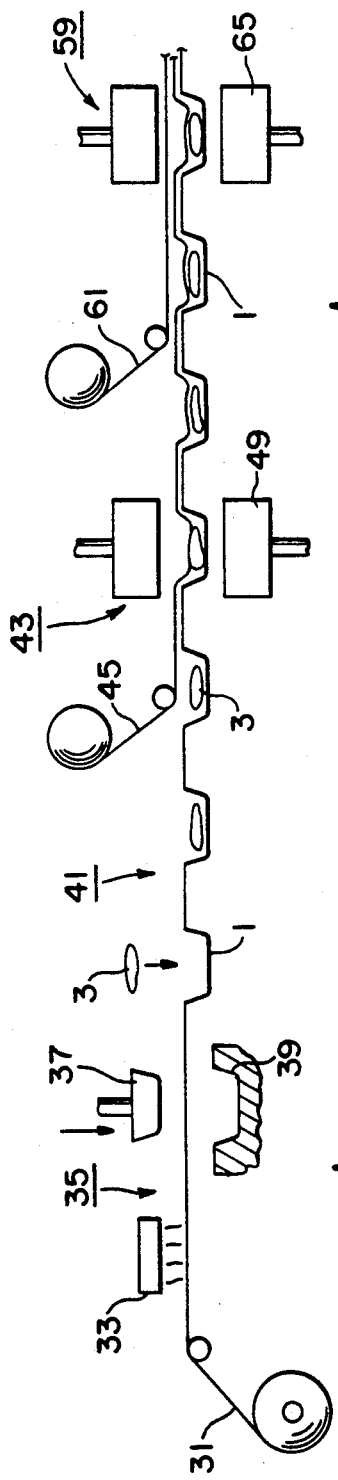
FIG. 6 is a schematic side view of one preferred machine used for performing a preferred method of the present invention.
Figure 7:
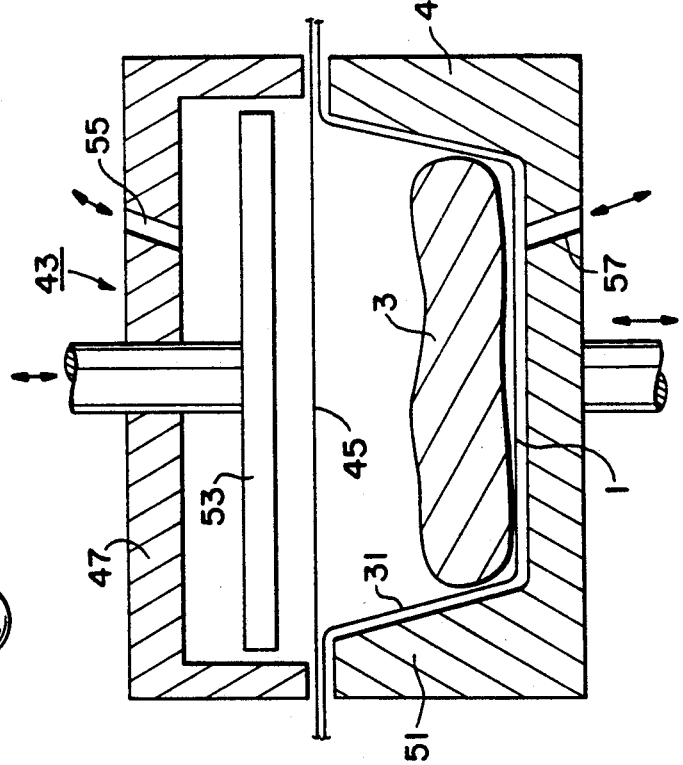
FIG. 7 is a close-up side cross-sectional view of a station of the machine where a web of plastics material is skin packaged over goods on the base.

Referring now to FIG. 6 there is shown a side view in diagrammatic form of a preferred packaging machine which performs a preferred packaging method in accordance with the present invention. The machine is arranged so that a web of plastics material 31 can pass underneath a heating member 33, be heated and then pass to a thermo forming station 35 where trays 1 can be produced by inserting a male die member 37 into a female die cavity 39. The so formed bases 1 then move to a goods loading station 41. The bases 1 are loaded with the goods such as food and then pass into a skin packing station 43. At the skin packing station 43, a web of plastics material 45 is arranged to run parallel with the web 31. FIG. 7 shows a close up view of the skin packing station 43. Here there is an upper chamber 47 and a lower chamber 49. The lower chamber 49 has a cavity 51 into which the bases 1 are received. The upper chamber 47 contains a heated member 53 which is used to heat the web 45 to a deformable temperature for skin packing. The upper chamber 47 and the lower chamber 49 are then closed and air is evacuated via gas passageways 55 and 57. The web 45 is maintained separate from the top of the base 1 during this evacuation process. The web 45 is then caused to move towards the heated member 53 to heat it to a deformable temperature. The undersurface of heated member 53 could be scollaped upwardly—i.e. concavely shaped so as to mirror imitate, at least to a small degree, the displacement required for the web 45 to skin pack to the goods 3. When the air has been evacuated, the heated member 53 is moved downwardly to then heat seal the web 45 around the periphery of the base 1 to the lip 11. Air or a gas is then reintroduced through passageway 55, at least, and this, in turn, causes the web 45 to skin pack the goods 3 to the base 1. The reason that it skin packs the goods 3 is that there is substantially no air between the web 45 and the base 1. Accordingly, when the air or gas is introduced through the passageway 55 the flexible web 45 skin packs the goods 3 by being displaced onto the upper surface of the goods 3.

Figure 8:
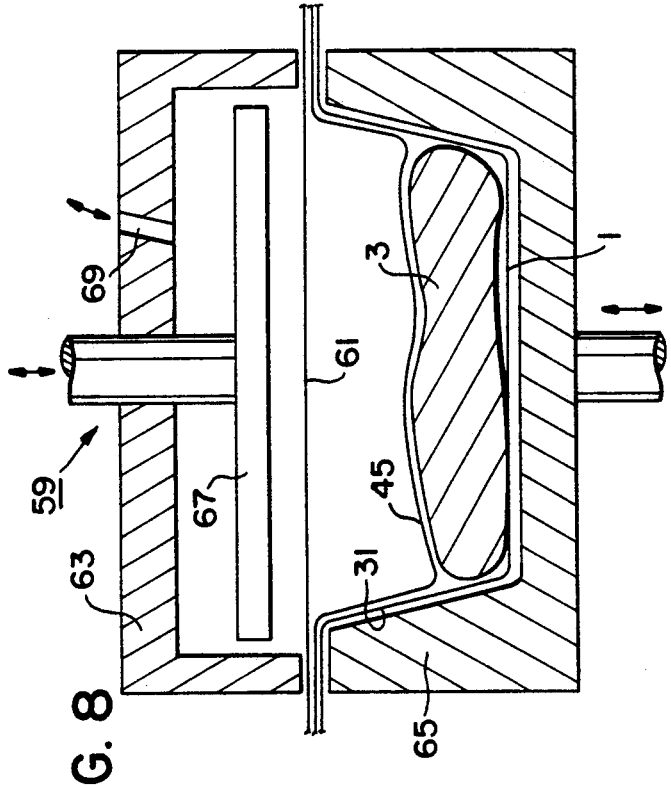
FIG. 8 is a view similar to that of FIG. 7 but showing a gas flushing station.

The bases 1 then move to a lid sealing station 59. At this station, a web of plastics material 61 is provided over the top of the base 1, over the web 45. FIG. 8 shows a detailed cross-sectional view of the lid sealing station 59. The lid sealing station 59 comprises an upper chamber 63 and a lower chamber 65. It also includes a heated platen 67. The platen 67 is conveniently heated only around the lip 11 region of the base 1. In use, the upper chamber 63 and the lower chamber 65 are closed together and air is evacuated through the air passageway 69. If desired a desired flushing gas can then be admitted through passage way 69 into the closed upper chamber 63 and lower chamber 65 so as to provide a desired gas between the lid and the base, i.e. between the web 61 and web 31. The platen 67 can then be lowered to heat seal the lid to the lip 11 of the base 1. Reference can also be made to applicant's earlier U.S. Pat. No. 4,685,274 incorporated herein for reference, for a further example of charging gas under the lid.

It should be appreciated that when the lid 7 is sealed to the base 1, there will be provided a free space, as shown by 9 in FIG. 1, and the free space contains a desired gas such as $O_2$, $N_2$ or $CO_2$ or other like gases which will enhance the keeping qualities of the packaged goods. If desired it may simply comprise atmospheric air.

The package is then removed from the lid sealing station 59 and separated from the web 31 by suitable means.

If desired, the skin packing station 43 can also include the step of admitting a desired flushing gas through the gas passageways 55 or 57 immediately prior to the sealing of the web 45 to the lip 11 of the base 1. This will provide a desired flushing gas within the space between the base 1 and the web 45.

It can be appreciated that by adding various stations to the apparatus shown in FIG. 6, any one of the embodiments shown in FIGS. 1 through 5 can be produced. For example, to produce the embodiment of FIG. 2 a further web of plastics material 13 need be provided prior to loading of the goods 3 into the base 1. The web 13 and 5 can be simultaneously welded to the peripheral lip 11 by a single heated platen. In producing the embodiment of FIG. 3 each of the webs 17 and goods 3 can be individually layered and then heat sealed to the peripheral lip 11. By appropriate additions, any one of the embodiments of FIGS. 1 through 5 can be produced. Such production is relatively economic and will yield a high throughput of packages.

When packaging goods such as fish, it is possible to retain the usual drip liquid with the fish but to allow for controlled atmosphere or gas to permeate through the skin webs. This, in turn, will allow for freezing of the contents without the growth of ice crystals or the like as is normal in frozen fish packaging. The appearance of the package is particularly enhanced by the double glazing effect provided by the lid 7 and the web 5 and 13 or webs 17. In the embodiments of FIGS. 2, 3 and 4 the goods 3 are effectively within an inner pouch. If desired the goods 3 can be frozen in a separately filled and sealed frozen pouch or in a jig of the same size as the semi rigid ovenable tray 27—see FIG. 5. Thus the goods 3 may be maintained in a separate pouch of plastics material prior to the freezing.

All the plastics materials from which the packaging is made may individually or collectively restrict and/or inhibit or control or allow selected atmosphere or gases to flow into or out of the package.

Figure 9:
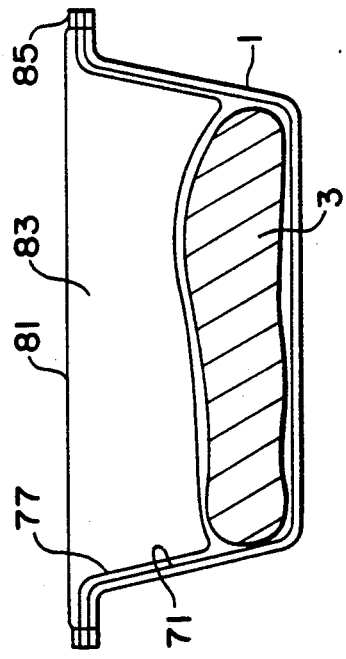
FIG. 9 is a diagrammatical, side view of a different type of packaging within the scope of the present invention.

Referring now to FIG. 9 there is shown a preferred form of an alternative embodiment of packaging. Here there is provided a P.V.C. base 1 with a skin packing 71. The skin packing 71 may be a partial gas barrier material of the type previously described. Goods 3 are placed within the base 1 above the skin packing 71. A further web of skin packing 77 is provided over the goods 3. The further web 77 is bonded to the web 71 and therefore a unitary package is provided by the base 1, the skin packing 71 and the further skin packing 77. Preferably, the web of skin packing 77 is a partial gas barrier material of the type previously described. If desired a lid 81 can be provided over the top of the base 1 as shown. Preferably the lid 81 is a gas barrier material and a gas such as $O_2$, $N_2$, $CO_2$ or like gas which will assist the keeping of the goods is provided in the space 83 which is formed between the skin packing material 77 and the peripheral lip 85 of the base 1 under the lid 81.

Figure 10:
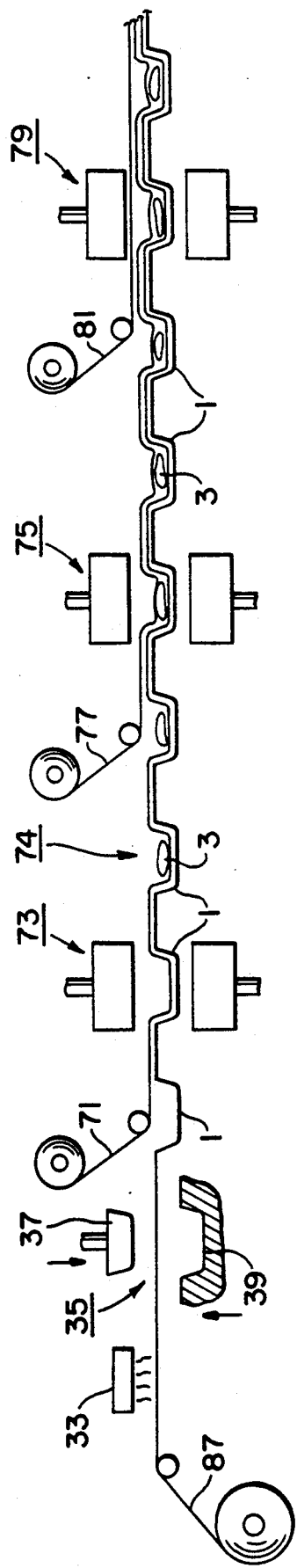
FIG. 10 is a diagrammatic side view of a preferred machine for making the package shown in FIG. 9.

Referring now to FIG. 10 there is shown a diagrammatic side view of a preferred machine for producing the package shown in FIG. 9. Here a web of plastics material 87 is produced with a number of depressions therein to form bases 1. Typically the web of plastics material 87 is P.V.C. which is relatively inexpensive. A heater 33 is provided for heating the web 87 whereupon the web 87 passes to a thermo forming station 35 where the bases 1 are produced by inserting a male die member 37 into a female die cavity 39.

The bases 1 are then passed to a skin packing station 73 where a web of skin packing plastics material 71 skin packs to the base 1. The skin packing station 73 is of a type similar to that shown in FIG. 7 and therefore has not been described in detail here. When the plastics material 71 is skin packed to the base 1, the base 1 is then passed to a station 74 where goods 3 are provided onto the base 1. The bases 1 and goods 3 then pass to a further skin packing station 75 where a web of plastics material 77 is skin packed to the top of the goods 3 and to the peripheral lip 85 around each of the bases 1. The bases 1 then advance to a lid sealing station 79 where lid material 81 is applied and bonded around the peripheral lip of the bases 1. If the webs 71, 77 and 81 are of a gas barrier material or selected ones of those webs is a gas barrier material and suitable gases are employed in the packaging either between the webs 71 and 77 and/or between webs 77 and 81, then the shelf life of the packaged goods 3 may be able to be enhanced.

Figure 11:
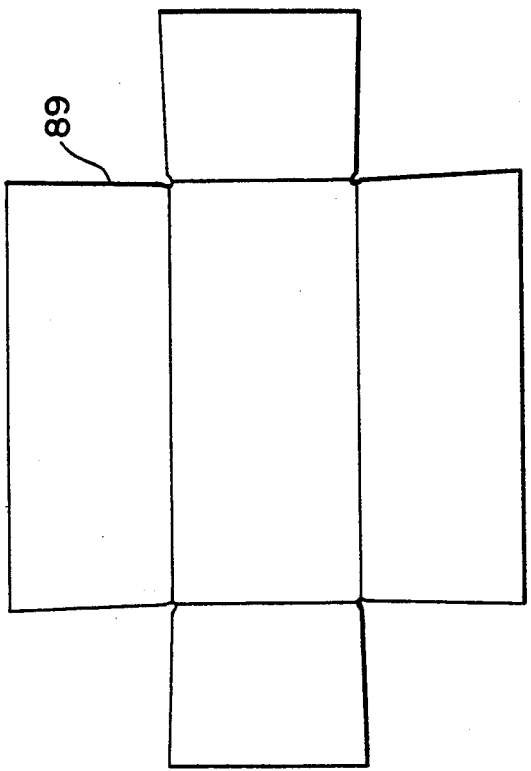
FIG. 11 is a plan view of a preferred insert for use in the package produced by the machine of FIG. 9.

FIG. 11 shows an insert 89 which can be placed into the bases 1 prior to the web 71 being skin packed thereto. In this connection the insert 89 is shaped so as to closely follow the contour of the bases 1. Thus when the skin packing material 71 is skin packed to the base 1, the insert 89 will be held firmly thereto. The insert 89 can have advertising material printed thereon so as to obviate the need for subsequent labeling of the package. Typically the insert 89 can be of a cardboard material and/or a paper and/or a plastics and/or a metal or foil or waxed material. By appropriate choice of the material of insert 89 it may be possible to avoid the necessity for skin packing a web of skin pack material 71 to the base 1. Accordingly, by providing the insert 89, the web 71 may be dispensed with.

Suitable gases for use in any of the embodiments herein are a combination of gases, or a single gas, including such atmospheric gases as Nitrogen, Carbon Dioxide and Oxygen, as well as other suitable gases.

Modifications may be made to the invention as would be apparent to persons skilled in the packaging and/or foodstuff art. These and other modifications are deemed to be within the scope of the invention, the nature of which is to be determined from the appended claims.

I claim:

1. A method of packaging goods including:
   (a) providing a base,
   (b) placing goods over said base,
   (c) applying a flexible web of gas permeable skin wrapping plastics material over said base and said goods and relative to said base to hold said goods relative to said base,
   (d) evacuating air or gas from between said base and said skin wrapping so as to allow said skin wrapper to flexibly displace onto said goods and to at least partially skin pack said goods,
   (e) applying a lid over said skin wrapping and spaced therefrom,
   (f) providing a desired gas in said space between said lid and said skin wrapping to enhance the keeping properties of the packaged goods by permeating said skin wrapping, and
   (g) sealing said lid to said base so that said space is permanently retained, and attaching said skin wrapping relative to said base.

2. The method of packaging goods according to claim 1, in which said web is heated prior to its displacement over said goods and said base.

3. The method of packaging goods according to claim 1, in which said lid and said flexible web are jointly sealed to said based.

4. The method of packaging goods according to claim 1, wherein said base has a cup shaped depression in which said goods are placed and a peripheral lip around the perimeter of said cup, and wherein said step of displacing effects movement of said web towards said base to a position below said lip.

5. The method of claim 4, wherein at least a portion of said web displaced below said lip engages and is skin packed to side walls of said cup.

6. The method of claim 1, further including the step of placing a further flexible web over said base prior to placing said goods over said base whereby said goods are enveloped by said webs.

7. The method of claim 6, wherein said base has a generally cup shaped depression, and wherein said further flexible web is displaced into said cup.

8. The method of claim 7, wherein said further flexible web engages the bottom of said cup.

9. The method of claim 8, wherein said further flexible web engages at least a portion of the side walls of said cup, and said first recited web overlies said further web in skin packing relation.

10. The method of packaging goods according to claim 1, in which said lid is semi-rigid, and said method includes the further step of placing a utensil in said lid.

11. The method of packaging goods according to claim 1, in which said flexible web is urged by positive gas pressure there above into skin packing conformation with its associated goods.

12. The method of packaging goods according to claim 1, in which said lid is sealed to said base in a manner than renders said lid peelable from said base separately from said flexible web.

13. The method of packaging goods according to claim 1, in which said base is made from a gas permeable material.

14. The method of packaging goods according to claim 1, in which said base is made of a partial gas barrier material.

15. The method of packaging goods according to claim 1, in which said base is made of a high gas barrier material.

16. The method of packaging goods according to claim 1, in which said lid is made of a gas permeable material.

17. The method of packaging goods according to claim 1, in which said lid is made of a partial gas barrier material.

18. The method of packaging goods according to claim 1, in which said lid is made of a high gas barrier material.

19. The method of packaging goods according to claim 1, including the further step of placing a removable insert on said base prior to the placement thereon of goods or a flexible web.

20. The method of packaging goods according to claim 1, including the further step of placing an oven usable container on said base prior to the placement of goods therein.

21. The method of packaging goods according to claim 1, in which said lid and said flexible web are heat sealable to said base.

22. A method of packaging goods comprising:
providing a base;
placing a first flexible web on said base;
placing first goods to be skin packed on said web;
providing a second gas permeable flexible web and displacing said second web towards said first goods so as to at least partially skin pack said first goods relative to said first web and to said base;
placing second goods to be skin packed on said second flexible web;
repeating the process by alternately placing further goods and flexible gas permeable webs one atop another and sealing the overlying flexible web relative to said base and over said goods until a desired number of goods have all been at least partially skin packed relative to said base;
applying a lid over the uppermost flexible web in spaced relation thereto;
providing the space between the uppermost web and said lid with a gas that will permeate said webs and prolong the preservation of said skin packed goods; and
sealing said lid to said base to retain said gas packed within the packaging.

23. The method of packaging goods according to claim 22, in which the space between the uppermost web and said lid is filled with a gas that will permeate said webs and prolong the preservation of said skin packed goods.

24. The method of packaging goods according to claim 22, in which the space between the lowermost web and said base is filled with a gas that will permeate said webs and prolong the preservation of said skin packed goods.

25. The method of packaging goods according to claim 23, in which said gas is oxygen, nitrogen, carbon dioxide, atmospheric air or other gas selected for its preservation characteristics.

26. The method of packaging goods according to claim 24, in which said gas is oxygen, nitrogen, carbon dioxide, atmospheric air or other gas selected for its preservation characteristics.

27. The method of packaging goods according to claim 22, in which each said flexible web is jointly sealed with said lid to said base.

28. The method of packaging goods according to claim 22, in which each said flexible web is heated prior to its displacement on said associated goods to enhance skin packing.

29. The method of packaging goods according to claim 22, in which each said flexible web is urged by positive gas pressure thereabove into skin packing conformation with its associated goods.

30. The method of packaging goods according to claim 22, in which said lid is sealed to said base in a manner that renders said lid peelable from said base separately from said flexible web.

31. A method of packaging goods as claimed in claim 1, comprising providing bases, said web of flexible material and lids in continuous strips, and separating each completed package of packaged goods from the remainder of said strips.

32. A method of packaging goods as claimed in claim 22, comprising providing bases, said web of flexible material and lids in continuous strips, and separating each completed package of packaged goods from the remainder of said strips.

33. A method of packaging goods comprising:
providing a base;
placing goods to be packaged over said base;
placing a web of gas permeable flexible material above said base and said goods;
displacing said flexible web toward said goods and engaging said web over said goods so as to at least partially skin pack said goods relative to said base;
positioning a lid over said base and said flexible web in spaced relation to said web so as to define therewith a space;
providing the space between said lid and said flexible web with a gas that can permeate said flexible web and prolong the preservation of said skin packed goods; and
sealing said lid to said base to retain said gas within the packaging.

* * * * *